United States Patent [19]
Roth

[11] 3,902,510
[45] Sept. 2, 1975

[54] DENTAL FLOSS DEVICE

[75] Inventor: Sonia Roth, Willowdale, Canada

[73] Assignee: Lawrence Peska Associates, Inc., New York, N.Y. ; a part interest

[22] Filed: Aug. 16, 1974

[21] Appl. No.: 497,858

[52] U.S. Cl............................ 132/92 A; 128/335.5
[51] Int. Cl............................................. A61c 15/00
[58] Field of Search.................. 132/92 A, 92 R, 90

[56] References Cited
UNITED STATES PATENTS

| | | | |
|---|---|---|---|
| 2,128,701 | 8/1938 | Gelinsky | 128/335.5 |
| 3,830,247 | 8/1974 | Kaphalakos | 132/90 |

Primary Examiner—G. E. McNeill

[57] ABSTRACT

A dispenser for dental floss has a spool containing it and a sponge for applying a liquid to the floss. A capillary tube conveys the liquid from a container to the sponge.

10 Claims, 3 Drawing Figures

PATENTED SEP 2 1975                                      3,902,510

DENTAL FLOSS DEVICE

The present invention relates to dental floss containers, and more particularly to ones which supply the floss wetted by a liquid which could be an oral antiseptic.

Many people add liquids to dental floss before use to flavor or disinfect it. This is obviously inconvenient and messy.

It is therefore an object of the present invention to provide dental floss that is already wetted by a liquid.

It is a further object to provide a unit for so providing that is either self contained or attachable to a bottle of said liquid.

In brief, these and other objects are provided by having a container for the liquid disposed proximate a spool of floss. The floss goes over a sponge that is supplied with the fluid by a capillary tube.

These and other objects, features, and advantages will become apparent from the following description when taken in conjunction with the drawings in which.

Figure 1:
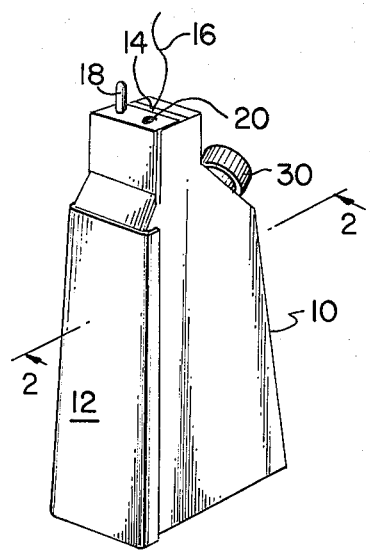
FIG. 1 is an isometric view of the invention.

FIG. 1 shows a device having main container 10 and a removable back cover 12. A hole 14 for passing floss 16 therethrough is located at the top of container 10 as is a post 18 and a cutter 20.

Figure 2:
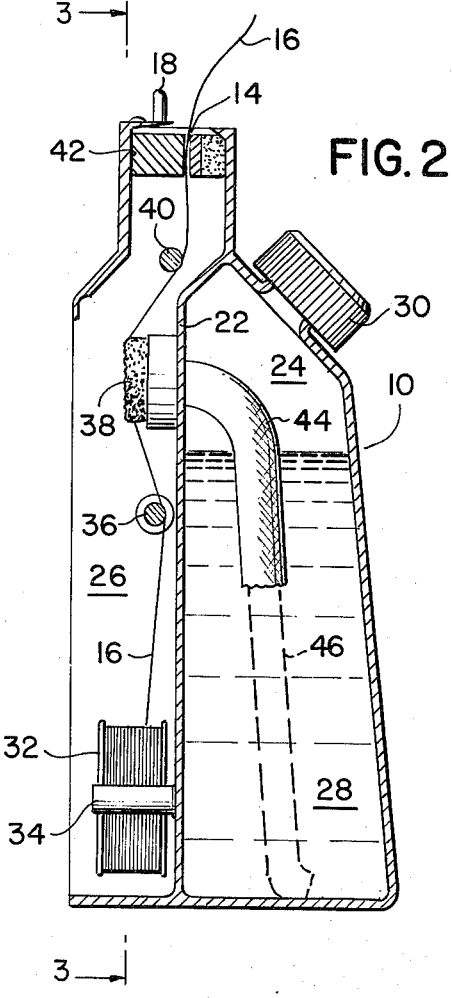
FIG. 2 is a side cross-sectional view taken along line 2—2 of FIG. 1.
Figure 3:
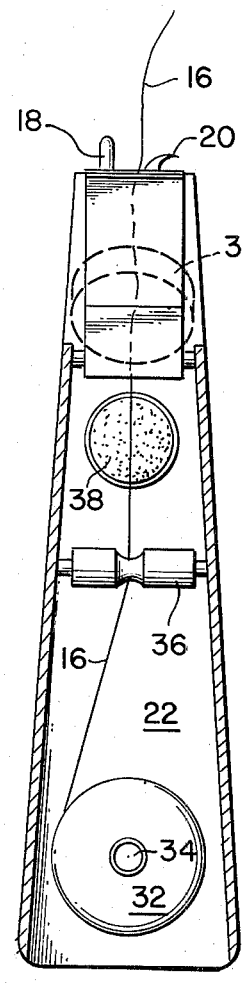
FIG. 3 is a back view with a rear cover removed.

FIGS. 2 and 3 show that an inner wall 22 that divides container 10 into a liquid containing compartment 24, and a floss compartment 26. A disinfectant or flavoring liquid 28 is disposed in said compartment 24, which can be done by removing filling cap 30. In floss compartment 26 is a spool 32 of waxed or unwaxed floss 16 rotatably mounted on spindle 34. The floss 16 passes over a rotatable guide 36, a sponge 38, another guide 40, and finally out hole 14 through a plug 42 of resilient material, which prevents drying of sponge 38. A capillary tube 44 and an optional wick 46 in compartment 24 keep sponge 38 moist with liquid 28.

In operation, the floss 16 passes over sponge 38 as it is being withdrawn through hole 14 and thus no further wetting of it is necessary. The floss 16 is then wraped about post 18 and cut by cutter 20 to a desired length.

It will be appreciated that liquid 28 can be "Lavoris"*, "Cepecol"*, etc. Also, the invention can be an attachment for a bottle of same. Many other embodiments are possible.

* A Registered trade-mark owned by: Lavoris: Vick Manufacturing Division of Richardson-Merrell Cepecol: Merrell-National Laboratories, Division of Richardson-Merrell, Inc.

Having herein described the invention, what is claimed as new is:

1. A device for providing dental floss wetted by a liquid, said device comprising means for storing and providing said floss, means proximate said storing means for containing said liquid, means communicating with said containing means for conveying said liquid, and means communicating with said conveying means for engaging said floss and applying thereto said liquid.

2. A device as claimed in claim 1 wherein said storing and providing means comprises a spool.

3. A device as claimed in claim 1 wherein said conveying means comprises a capillary tube communicating with said engaging and applying means.

4. A device as claimed in claim 3 wherein said conveying means further comprises a wick attached to said tube.

5. A device as claimed in claim 1 wherein said engaging and applying means comprises a sponge.

6. A device as claimed in claim 1 further comprising a rotatable guide disposed between said storing and providing means and said engaging and applying means.

7. A device as claimed in claim 1 further comprising means disposed proximate said engaging and applying means for cutting said floss.

8. A device as claimed in claim 1 further comprising said liquid, said liquid comprising an oral antiseptic.

9. A device as claimed in claim 1 further comprising said liquid, said liquid comprising a flavoring.

10. A device as claimed in claim 1 further comprising means for preventing drying of said engaging and applying means.

* * * * *